(12) United States Patent
Rhodes, Jr. et al.

(10) Patent No.: US 10,546,429 B2
(45) Date of Patent: Jan. 28, 2020

(54) AUGMENTED REALITY MIRROR SYSTEM

(71) Applicant: Adobe Inc., San Jose, CA (US)

(72) Inventors: Tenell Glen Rhodes, Jr., Campbell, CA (US); Jose Ignacio Echevarria Vallespi, San Jose, CA (US); Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/897,127

(22) Filed: Feb. 14, 2018

(65) Prior Publication Data

US 2019/0251749 A1    Aug. 15, 2019

(51) Int. Cl.
| | | |
|---|---|---|
| G06T 19/00 | (2011.01) | |
| G02B 5/08 | (2006.01) | |
| G06T 15/10 | (2011.01) | |
| G06T 19/20 | (2011.01) | |

(52) U.S. Cl.
CPC .......... *G06T 19/006* (2013.01); *G02B 5/0808* (2013.01); *G06T 15/10* (2013.01); *G06T 19/20* (2013.01); *G06T 2219/012* (2013.01)

(58) Field of Classification Search
None
See application file for complete search history.

(56) References Cited

U.S. PATENT DOCUMENTS

| | | | |
|---|---|---|---|
| 8,405,680 B1* | 3/2013 | Cardoso Lopes | G06T 19/00 345/426 |
| 2016/0292917 A1* | 10/2016 | Dorner | G03B 21/2053 |
| 2017/0215655 A1* | 8/2017 | Ophardt | A47K 3/281 |
| 2019/0018486 A1* | 1/2019 | Benford | A45D 42/10 |

OTHER PUBLICATIONS

"MirroCool: all-in-one Smart Mirror and Personal Assistant", Retrieved at: https://www.kickstarter.com/projects/mirrocool-the-smart-mirror-that-knows-you—on Sep. 28, 2017, 25 pages.
"Smart Mirror Store | Optical Quality Beamsplitter Glass", Retrieved at: https://www.twowaymirrors.com/smart-mirror/—on Sep. 28, 2017, 8 pages.
Patkar,"6 Best Raspberry Pi Smart Mirror Projects We've Seen So Far", Retrieved at: http://www.makeuseof.com/tag/6-best-raspberry-pi-smart-mirror-projects-weve-seen-far/—on Sep. 28, 2017, Sep. 9, 2016, 9 pages.

* cited by examiner

*Primary Examiner* — William A Beutel
(74) *Attorney, Agent, or Firm* — SBMC (57) ABSTRACT

An augmented reality (AR) mirror system is described. In an example, the AR mirror system includes a sensor, a display device, a semi-reflecting surface, a processing system, and computer-readable storage media having instructions stored thereon. The instructions are executable by the processing system to cause display of augmented reality (AR) digital content by the display device to be simultaneously viewable with a reflection of a physical object.

20 Claims, 8 Drawing Sheets

602
Generate a real depth map from sensor data received from a sensor, the real depth map describing a location of an object in a physical environment with respect to a first side of a semi-reflecting surface

604
Obtain a virtual depth map describing a virtual location of the AR digital content based on a physical distance that separates a display device of the system from a second side of the semi-reflecting surface

606
Synthesize the AR digital content by comparing the real depth map with the virtual depth map

608
Display the synthesized AR digital content as viewable through the semi-reflecting surface simultaneously with a reflection of the physical object at the first side of the semi-reflecting surface

AUGMENTED REALITY MIRROR SYSTEM

BACKGROUND

Augmented reality has been developed to expand the ways, in which, a user may interact with a computing device. In augmented reality (AR), AR digital content is displayed by a display device to augment a user's view of a physical environment. For example, AR digital content is typically associated with a physical location to appear as included at that location when viewed by a user, e.g., a display of a cartoon character on a user's desk. Conventional devices used to support augmented reality, however, are typically cumbersome to use or limited in a display supported by the devices.

AR goggles, for instance, may be worn by a user to view AR digital content along with a view of the physical environment. Conventional AR goggles, however, are typically large and support a limited field-of-view. As a result, conventional AR goggles are cumbersome to use and limit a user's ability to interact with the physical environment due to restrictions in the field-of view supported by the goggles.

Other instances involve a "smart mirror," in which a display device contacts a reflective surface, such as a two-way mirror, to output digital content. In a conventional smart mirror, the display device is placed in contact with the two-way mirror. This contact causes digital content displayed by the display device to appear at a surface of the mirror. Because of this contact, however, conventional smart mirror techniques are limited in a richness in how the digital content is displayed, e.g., appears flat and in the plane of the mirror. Further, techniques used to support user interaction with conventional smart mirror techniques are also limited to contact with a surface of the smart mirror, e.g., through touchscreen functionality, which causes contamination of the surface and thus reduces an ability to view the digital content.

SUMMARY

An augmented reality (AR) mirror system is described. In an implementation, the AR mirror system is configured to support output of AR digital content that expands ways in which a user may interact and view digital content in real time that overcome the limitations of conventional smart mirror techniques. To do so, the AR mirror system displays AR digital content using a display device and a semi-reflecting surface having first and second sides. The semi-reflecting surface is partially reflective and partially transmissive such that at least a portion of light displayed by the display device passes from the second side through the semi-reflecting surface and is visible from the first side of the semi-reflecting surface. This creates an optical illusion that the AR digital content is optically combined with a reflection of a physical environment as viewable via the semi-reflecting surface.

The display device is spaced at a depth within a housing as separated from the semi-reflecting surface. This causes display of AR digital content by the display device as part of the optical illusion to appear at this depth. In this way, user interaction with the AR mirror system may also be expanded to include depth, which is not possible in conventional smart mirrors.

A sensor, for instance, may be configured to detect depth of an object in relation to a first side of the semi-reflecting surface. This is used to generate a real depth map. The real depth map is then compared by the AR mirror system to a virtual depth map of AR digital content to synthesize the AR digital content. The virtual depth map is based at least in part on a depth, at which, the display device is spaced from the semi-reflecting surface. In this way, user interaction may be supported by the AR mirror system to include depth such that a user's view of a reflection may be used to interact with the display of the AR digital content using depth. As a result, this interaction may be performed in an intuitive manner using familiar techniques, e.g., that are learned through normal usage of a mirror to brush hair, shave, put on makeup, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

An augmented reality (AR) mirror system is described that is configured to overcome challenges of conventional devices used to output and support interaction with AR digital content. The AR mirror system is configured to support output of AR digital content to have an appearance of depth. This depth is based on a distance, at which, a display device is spaced apart from a semi-reflective surface, e.g., a two-way mirror.

The AR mirror system includes a display device, such as a LED or OLED television, projector, and so on, that is configured to display AR digital content. Light output as part of this display is transmitted to a semi-reflecting surface. The semi-reflecting surface is partially reflective and partially transmissive such that at least a portion of the light transmitted by the display device passes from the second side through the semi-reflecting surface and is visible from the first side of the semi-reflecting surface. This creates an optical illusion that the AR digital content is optically combined with a reflection of a physical environment as viewable via the semi-reflecting surface.

In one example, the AR mirror system includes a housing. The semi-reflecting surface is attached to the housing and the display device is disposed within the housing. An interior of the housing and components of the AR mirror system within the interior that are not intended for viewing by a user are configured to be darker (i.e., have less light) than a physical environment, in which, the AR mirror system is disposed. This may be achieved through coloring, lack of reflective surfaces (e.g., of the display device), and so forth. This causes the AR digital content to be viewable through the semi-reflecting surface but not these other components. As a result, a user disposed on the opposing side of the semi-reflecting surface may simultaneously view an optical illusion that includes the AR digital content along with a reflection of the user.

User interaction with the AR digital content is supported by the AR mirror system using a reflection of the user and the display of the AR digital content that is viewable through the semi-reflecting surface. To do so, the AR mirror system generates a real depth map of an object (e.g., in a physical environment) from sensor data received from a depth sensor. The real depth map is compared by the AR mirror system with a virtual depth map of the AR digital content. The virtual depth map is based at least in part on a physical distance that separates the display device from the second side of the semi-reflecting surface. In this way, the AR digital content may be synthesized by the AR mirror system to take into account the depth, at which, the AR digital content is visible through the semi-reflecting surface and a depth, at which, a reflection of a user appears via the semi-reflecting surface.

The AR mirror system, for instance, may synthesize the AR digital content based on the detected 3D location of the user in the physical world from the real depth map with the display of the AR digital content as likely viewed by the user based on the virtual depth map. This may be performed using three-dimensional head tracking and detected position of the user, collision simulations and collision detection techniques, and so forth.

A variety of different usage scenarios are made possible using these techniques. In a first such example, the display device is configured to support an output of the AR digital content in two dimensions, e.g., as a television. This causes the display of the AR digital content, when viewed by a user, to appear at a distance through the semi-reflecting surface of the AR mirror system that coincides with the physical distance at which the display device is spaced from the semi-reflecting surface.

User interaction is then performed by the user by viewing the user's reflection at the semi-reflective surface and how that reflection relates to the display of the AR digital content at that depth. The AR mirror system, for instance, may be configured to detect user interaction at a sensing plane that is the same distance from the semi-reflecting surface as the display device is disposed at an opposing side of the semi-reflecting surface. As a result, user interaction defined at that sensing plane corresponds visually to the display of the AR digital content. Thus, this supports an efficient and intuitive technique to interact with the AR digital content using familiar techniques, e.g., that are learned through normal usage of a mirror to brush hair, shave, put on makeup, and so forth. Head tracking may also be performed to alter the point of view, from which, the user interaction occurs to support a reactive and more natural visual experience. Further discussion of this example may be found in relation to FIGS. 2A and 2B.

In a second such example, the display device is configured to support an output of the AR digital content in three dimensions (e.g., through output of stereoscopic images, light fields, and so forth) to support an appearance of three-dimensional depth. This causes the display of the AR digital content, when viewed by a user, to have an appearance of three-dimensional depth based on the disparity in the displayed AR digital content in a three-dimensional volume in front of the display device.

User interaction is then performed by the user by viewing the AR digital content via a reflection by the semi-reflecting surface as before. Further, this user interaction in this example is not limited to a sensing plane but may also support user inputs in three dimensions (e.g., a three-dimensional sensing volume) through use of the sensor, e.g., X, Y, and Z directions to leverage this appearance of depth. As a result, this also supports an efficient and intuitive technique to interact with the AR digital content using familiar techniques, directly. Further discussion of this example may be found in relation to FIGS. 3-4.

Thus, in the examples above the AR mirror system may support output of AR digital content in a variety of ways, such as through a conventional two-dimensional display, a stereoscopic 3D display, an automultiscopic 3D display, and so forth. Those changes affect the AR digital content as rendered as a two-dimensional image, a stereo pair, or a light field, respectively. This also affects how the AR digital content is perceived, e.g., as a 2D plane, a 3D object with a fixed point of view, or a 3D object that can be seen from additional points of view. In each of these instances, the AR experience is created by the light viewed coming from the display device though the semi-reflective surface, superimposed on the reflection of the environment in the semi-reflective surface. For the 2D display, the 2D content is perceived in the plane of the display.

By adjusting the offset between the left and right graphical objects in a 3D display (known as disparity), the AR content can appear to be in front of or behind a 3D display plane. By continuously changing disparity across an image pair, a 3D shape may be depicted with proper depth cues so as to appear natural. For stereo content, the zero disparity portion of the image pair will appear in the plane of the display. The "zone of comfort" for the display device, which is the range of depths that may be viewed comfortably using stereo glasses is centered on the plane of the stereo display. The zone of comfort arises due to the mismatch between the focusing (accommodation) of the user's eyes, and the convergence (viewing direction) of the pair of eyes. This is minimized when a low disparity graphic is shown, which is perceived to be close to the plane of the display. In the AR mirror system, the plane of the display may also be close to the virtual image of the user reflected in the display, so graphical elements may be placed close in depth to the reflection (virtual image) of the user, while still being viewed comfortably. This indirect arrangement thus allows a viewing experience with increased comfort than if a stereo display was placed immediately adjacent to the semi-reflecting surface, which involves use of high-disparity content to attain a viewing depth similar to the depth of the virtual reflection.

For an automultiscopic display, the same considerations of the zone of comfort would apply, but stereo glasses are not required to gain a stereo perception of the AR content, and the system may accommodate head motions optically for limited ranges of motion, supporting a moving viewpoint. For a stereo display, the tracking and update of the stereo content is performed with low latency and high framerate to maintain the correct illusion of view dependence for a moving user in real time.

In the following discussion, an example environment is first described that may employ the techniques described herein. An example procedure is also described which may be performed in the example environment as well as other environments. Consequently, performance of the example procedure is not limited to the example environment and the example environment is not limited to performance of the example procedure.

Example Environment

Figure 1:
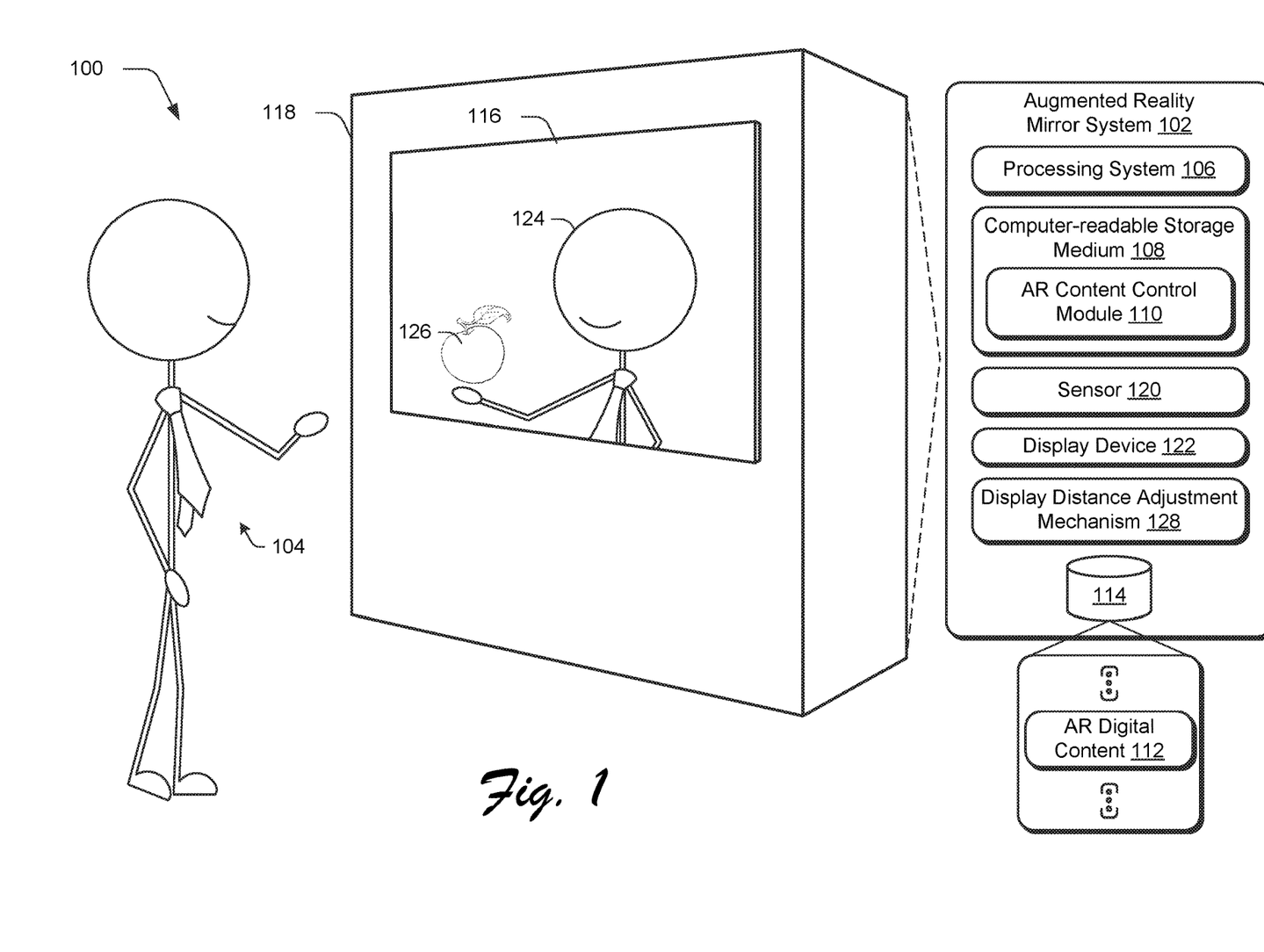
FIG. 1 is an illustration of a digital medium environment in an example implementation that is operable to employ an augmented reality mirror system as described herein.

FIG. 1 is an illustration of a digital medium environment 100 in an example implementation that is operable to employ an augmented reality mirror system as described herein. The illustrated environment 100 includes an augmented reality mirror system 102 and a user 104. The augmented reality mirror system 102 may include functionality of a computing device, e.g., a processing system 106, and computer-readable storage medium 108. The computer-readable storage medium 108 is configured to store instructions that, responsive to execution by the processing system 106, causes performance of operations by the computing device as specified by the instructions as further described in relation to FIG. 7.

An example of functionality executable by the augmented reality mirror system 102 is illustrated as an AR content control module 110. The AR content control module 110 is configured to control output and interaction with AR digital content 112, which is illustrated as stored in a storage device 114. To support interaction of the user 104 with the AR digital content 112 in this example, the AR mirror system 102 includes a semi-reflecting surface 116, a housing 118, a sensor 120, and a display device 122.

The semi-reflecting surface 116 may be formed from plastic or glass that encases a reflecting layer formed using a thin layer of metal, e.g., aluminum. This causes the semi-reflecting surface 116 to support reflection of light from one side (e.g., a physical environment of the user 104) yet permit transmission of light through the mirror 116 from an opposing side, e.g., within the housing 118 from the display device 122. This optical property may be tuned by changing a thickness of the reflecting layer to permit more or less light to be transmitted through the semi-reflecting surface 116 and conversely intensity of a reflection 124 of the user 104.

In the illustrated example, this effect is leveraged by the AR content control module 110 to display AR digital content 112 by the display device 122 to cause this display to pass through the semi-reflecting surface 116. The display 126 of the AR digital content 112 is thus viewable by the user 104, whereas other components of the AR mirror system 102 are not by being disposed (and not illuminated) within a dark interior of the housing 116. As a result, the user 104 may view both the user's reflection 124 on the semi-reflecting surface 116 and the display 126 of the AR digital content 112 through the semi-reflecting surface simultaneously without viewing the other components.

The sensor 120 is leveraged by the AR content control module 110 to support interaction with this display. In one example, the sensor 120 is configured as a depth sensor, such as a structured light grid array device in which an infrared projector and camera are used to detect depth. This may be used for skeletal mapping, motion capture, facial recognition, and so on. In another example, the sensor 120 is configured as a time-of-flight camera system which is a range imaging camera system that performs depth sensing based on a known speed of light by measuring the time-of-flight of a light signal between the camera and the subject for each point of the image. Other examples are also contemplated, including a camera system (e.g., monocular, stereo, light field), radar technologies in which Wi-Fi signals are used to perform depth sensing and motion tracking without using other external signals to determine characteristics of a physical environment of the user, e.g., skeletal tracking, object detection and identification, and so on. These characteristics are then exposed by the sensor 120 via APIs (e.g., of an operating system of a computing device) or as signals that are directly processed by the AR content control module 110 (e.g., as executed by a CPU) to determine orientations of objects, identify objects, identify motion, and even detect gestures performed by the user 104.

In this way, the AR content control module 110 may support a natural user interface that does not involve contact of the user 104 with the augmented reality mirror system 102, e.g., a surface of the semi-reflecting surface 116. This may be used to support a variety of types of user interaction scenarios. Examples of these scenarios described in the following discussion are based on configuration of the display device 122 as supporting two-dimensional output as further described in relation to FIGS. 2A-2B and three-dimensional output as further described in relation to FIGS. 3-4.

The augmented reality mirror system 102 is also illustrated as including a display distance adjustment mechanism 128. This mechanism is configured to support a change in a physical distance between the display device 122 and the semi-reflecting surface 116, such as through use of a track system, articulated arms, hydraulics, electric motors, and so forth. In this way, a depth at which the display 126 of the AR digital content 112 is perceived may also be adjusted.

This distance may be adjusted manually by the user 104 or automatically by the AR content control module 110. The AR content control module 110, for instance, may detect a distance at which the user 104 is disposed from the semi-reflecting surface 116 using the sensor 120. Based on this, the AR content control module 110 causes the display device 122 to be positioned at a similar distance from the semi-reflecting surface 116, e.g., automatically and without user intervention. This causes the reflection 124 of the user 104 to appear at a similar depth to the display 126 of the AR digital content 112 as viewable through the semi-reflecting surface 116. Further, this may also be used to adjust a plane, at which, user interaction is detected by the sensor 120 as further described in relation to FIGS. 2A-2B such that detection of user interaction and the user's view of this interaction coincide, thereby supporting natural and intuitive interactions.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2A:
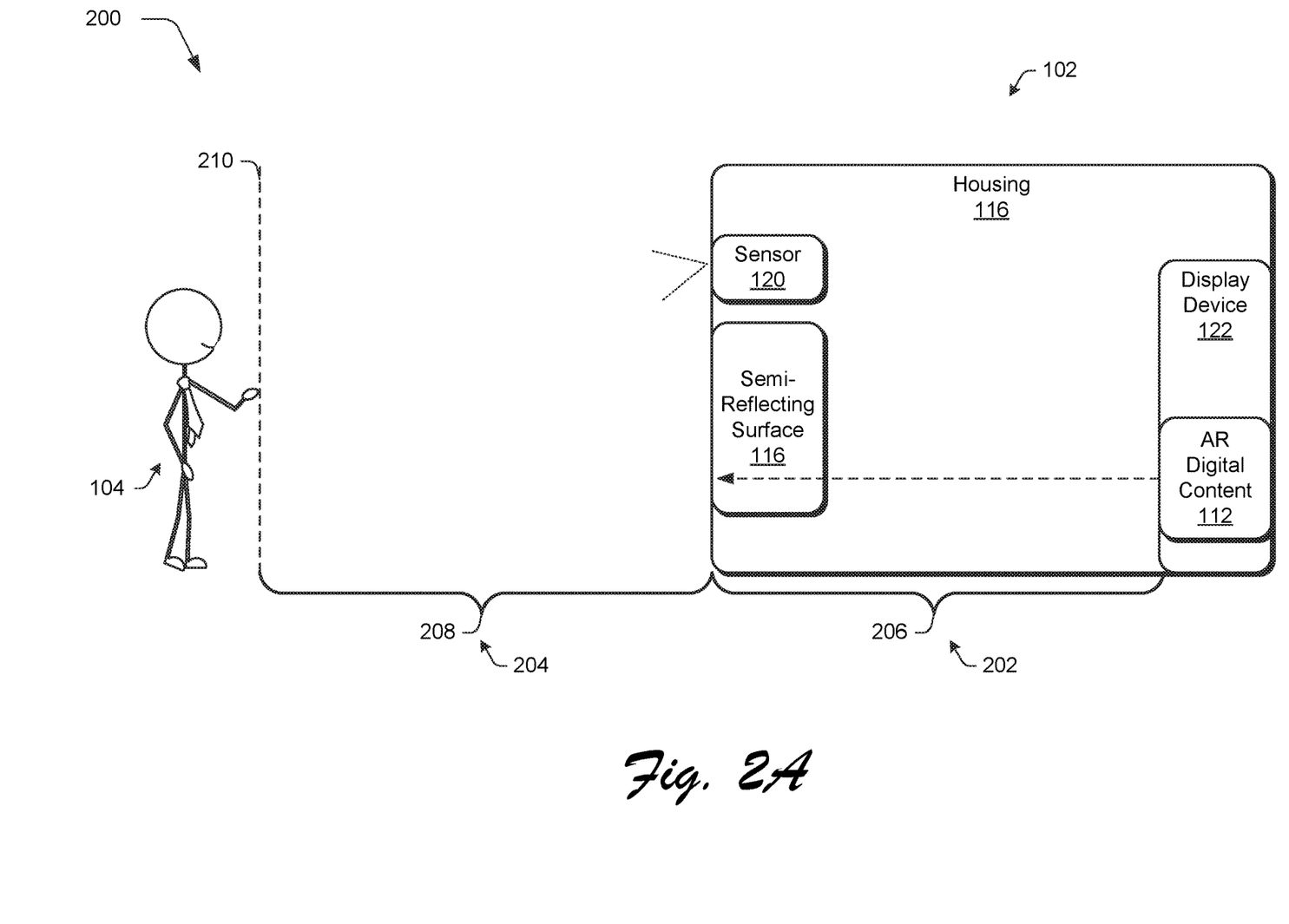
FIGS. 2A and 2B depict a system in an example implementation in which a display device of FIG. 1 is configured to support a two-dimensional output as part of operation with the augmented reality mirror system.
Figure 2B:
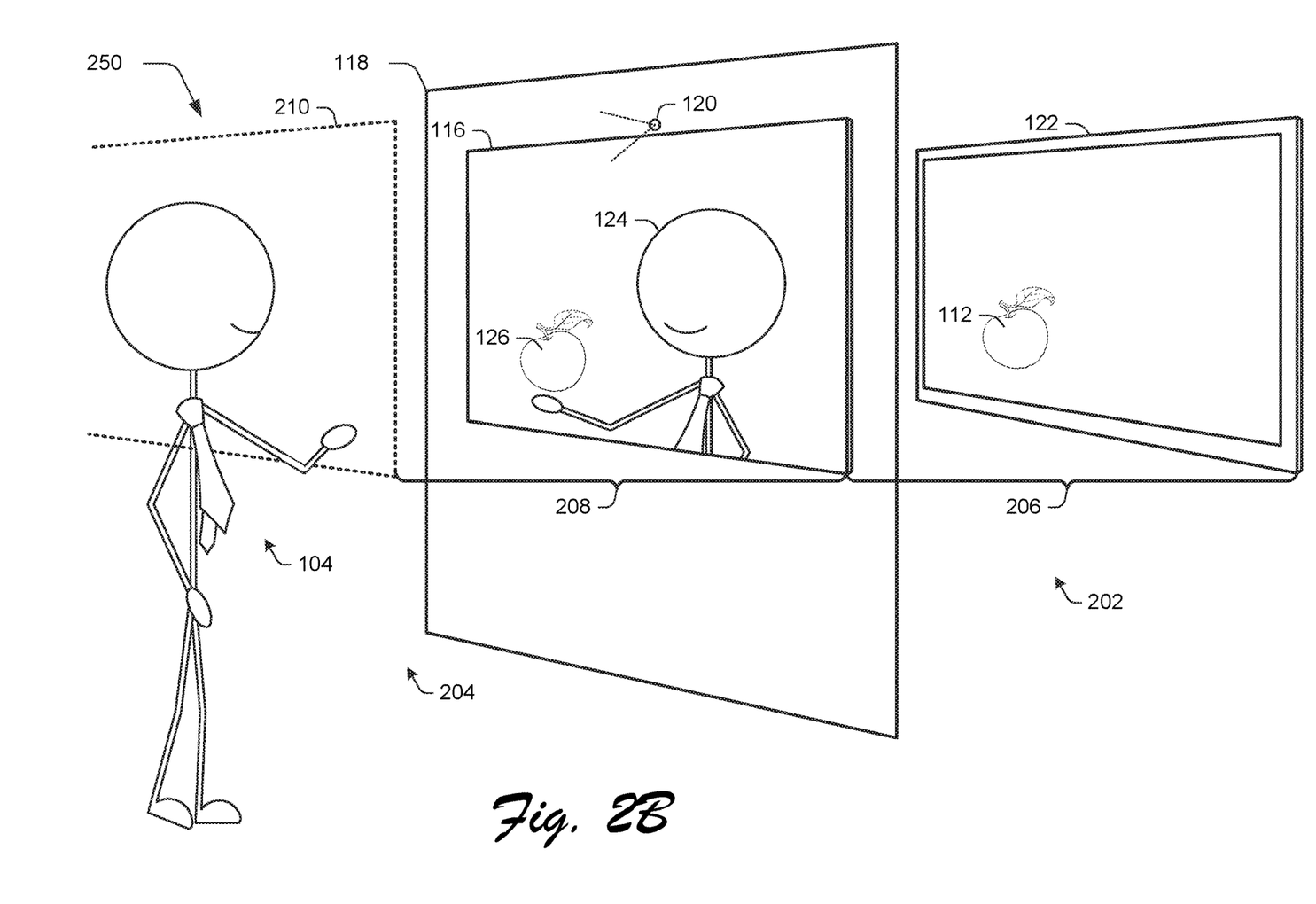

FIGS. 2A-2B depict systems 200, 250 in an example implementation in which the display device 122 of FIG. 1 is configured to support a two-dimensional output as part of operation with the augmented reality mirror system 102. FIG. 2A illustrates a cutaway view of the system and FIG. 2B depicts a perspective view of the system.

The augmented reality mirror system 102 includes the AR content control module 110, semi-reflecting surface 116, housing 118, sensor 120, and display device 122 as previously described. In this example, the display device 122 is configured to display the AR digital content 112 in two dimensions, e.g., through use of an LED display device, OLED display device, projector, and so forth.

The display of the AR digital content 112 by the display device 122 is visible through the semi-reflecting surface 116 as illustrated through use of an arrow. The transmission of light from the display device 122 via the semi-reflecting surface 116 causes display 126 of the AR digital content 112. By ensuring that other elements inside the enclosure are not visible within the housing 116 through dark coloring and poor illumination, graphical elements (i.e., the AR digital content 112) displayed by the display device 122 are visible, solely, as superimposed on the reflection of the physical environment and the user 104. Additionally, in at least one implementation the contrast ratio of the display device 122 is set as high, which allows portions of the display device 122 to appear dark. Further, the display device 112, itself, is not highly reflective so that it doesn't reflect back onto the back facing part of the semi-reflecting surface and create undesired artifacts. This may be achieved, for example, using a modern OLED-based display device.

In the illustrated example, the semi-reflecting surface 116 is spaced an adjustable first physical distance 206 from the display device 122, i.e., does not contact the display device 122. This causes the display 126 of the AR digital content 112 to appear to the user 104 as also spaced at that distance away from a surface of the semi-reflecting surface 116 "outside" and "through" the housing 118. Consequently, user interaction with the display 126 of the AR digital content 112 is performed by the user 104 by looking at the user's reflection 124. This interaction is supported at a second distance 208 from the semi-reflecting surface 116 based on the first distance 206 between the semi-reflecting surface 116 and the display device 122, e.g., the distances approximate each other. In this way, the AR digital content 112 is perceived as located in a real world that is viewable via a reflection on the semi-reflecting surface 116.

The AR content control module 110 is also configured to utilize the sensor 120 to detect user interaction at a two-dimensional plane 210 at the second distance 208. In this way, the user's 104 perception of interaction with the display 126 of the AR digital content 112 and the user's reflection 124 coincide, thereby supporting natural user interaction in a manner that mimics user interaction with conventional mirrors, e.g., to brush hair.

The AR content control module 110 may also support head tracking through use of the sensor 120 to support 3D perspective rendering on a 2D surface of the display device 122 and semi-reflecting surface 116. The sensor 120, for instance, may feature tracking of particular portions of the user 104 such as corners of the eyes and mouth, tip of nose, and so forth. From this, the sensor 120 may expose data via an API to the AR content control module 110 indicating a likely orientation of the user's 104 head in three-dimensional space.

The AR content control module 110 may then control how the AR digital content 112 (e.g., based on a 3D model) is displayed based on the head tracking as described above. The user 104, for instance, may "look around" the display 126 of the AR digital content 112 by turning of the head, move to different perspectives in relation to the display 126, and so forth. Based on this, the AR content control module 110 may configure the display 126 of the AR digital content 112 as performed by the display device 122 to react accordingly, e.g., to support different perspectives in relation to display 126. As a result, the display 126 may support rich user views of the AR digital content 112.

The AR content control module 110 is also configured to support rich user interaction with the models of the AR digital content 112. The AR content control module 110, for instance, may track locations of objects in three-dimensional space as previously described, e.g., a user's hand and fingers of the user's hand. This object, as detected, is modeled virtually and compared with a location of a model of the AR digital content 112 in three-dimensional space, e.g., through comparison of a real depth map with a virtual depth map of the AR digital content 112. Through collision detection techniques using these models, the AR content control module 110 may then control output of the AR digital content 112, such as to move the content, select the content, and so forth. In this way, the AR content control module 110 supports rich display and interaction with the AR digital content 112 in a natural user interface.

The augmented reality mirror system 102 may also include a display distance adjustment mechanism 128. This mechanism is configured to support a change in the adjustable first physical distance 206 between the display device 122 and the semi-reflecting surface 116, such as through use of a track system, articulated arms, hydraulics, electric motors, and so forth. In this way, a depth at which the display 126 of the AR digital content 112 appears as displayed by the semi-reflecting surface 116 may be adjusted, i.e., how far the AR digital content 112 appears behind or in front of a user's reflection.

This may be performed manually by the user 104 or automatically by the AR content control module 110. The AR content control module 110, for instance, may detect the second distance 208 at which the user 104 is disposed from the semi-reflecting surface 116 through use of the sensor 120. Based on this, the AR content control module 110 causes the display device 122 to be positioned by the display distance adjustment mechanism 128 at a similar first physical distance 206 from the semi-reflecting surface 116, e.g., automatically and without user intervention through use of a motor. This causes the reflection 124 of the user 104 to appear at a similar depth to the display 126 of the AR digital content 112.

Further, this may also be used by the AR content control module 110 to adjust a plane 210, at which, user interaction is detected by the sensor 120 such that this interaction appears to coincide with a distance at which the user's reflection 124 interacts with the display 126 of the AR digital content 112, i.e., at matching depths. In an implementation, this may be performed to automatically match movement of the user 104, e.g., within a defined range of distances supported by the display distance adjustment mechanism 128. Other examples are also contemplated involving output in three dimensions, an example of which is described as follows and is shown in corresponding figures.

Figure 3:
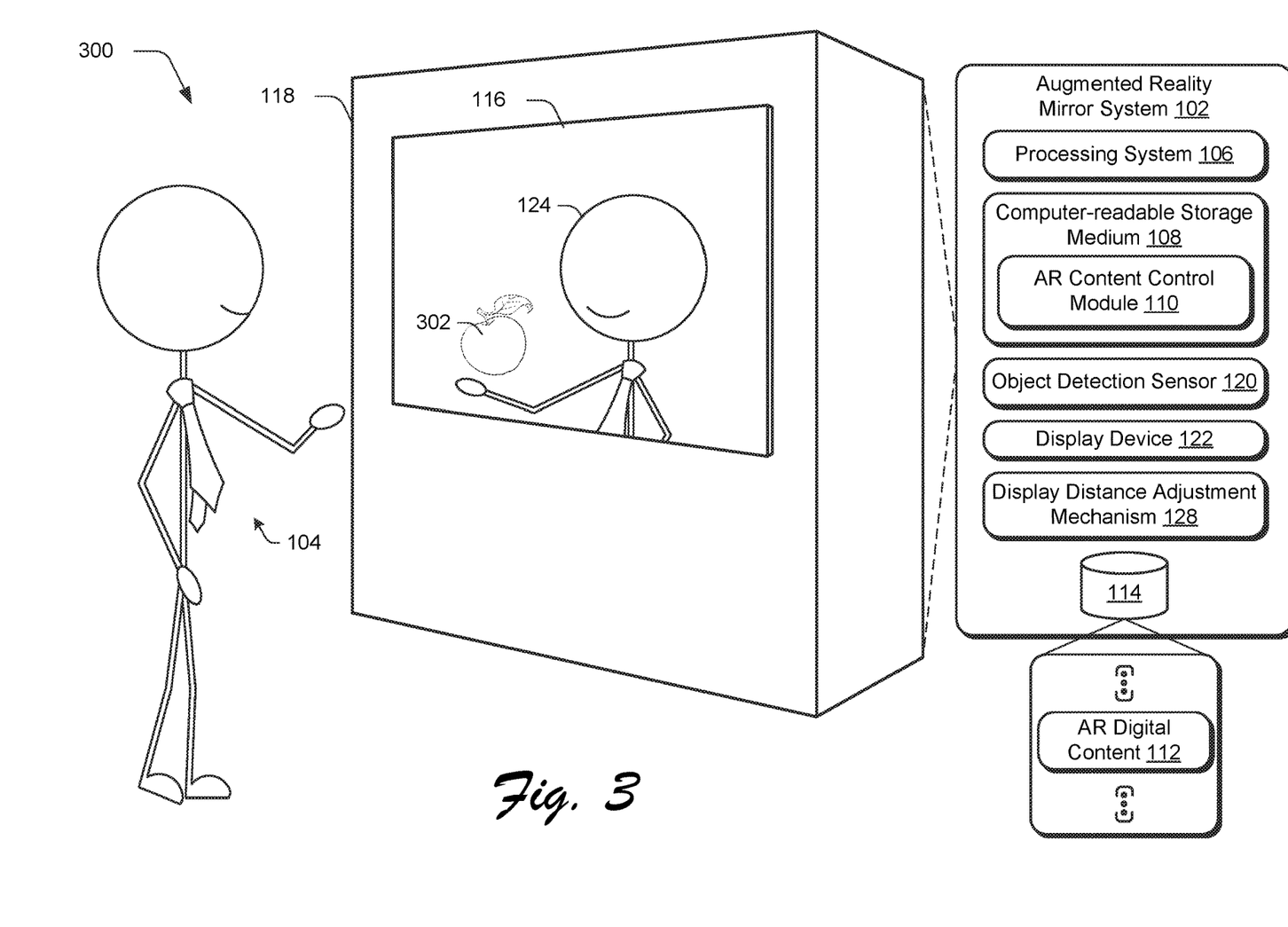
FIG. 3-4 depict systems in an example implementation in which the display device of FIG. 1 is configured to output AR digital content in three dimensions to support a display of the AR digital content by a semi-reflecting surface as having depth.
Figure 4:
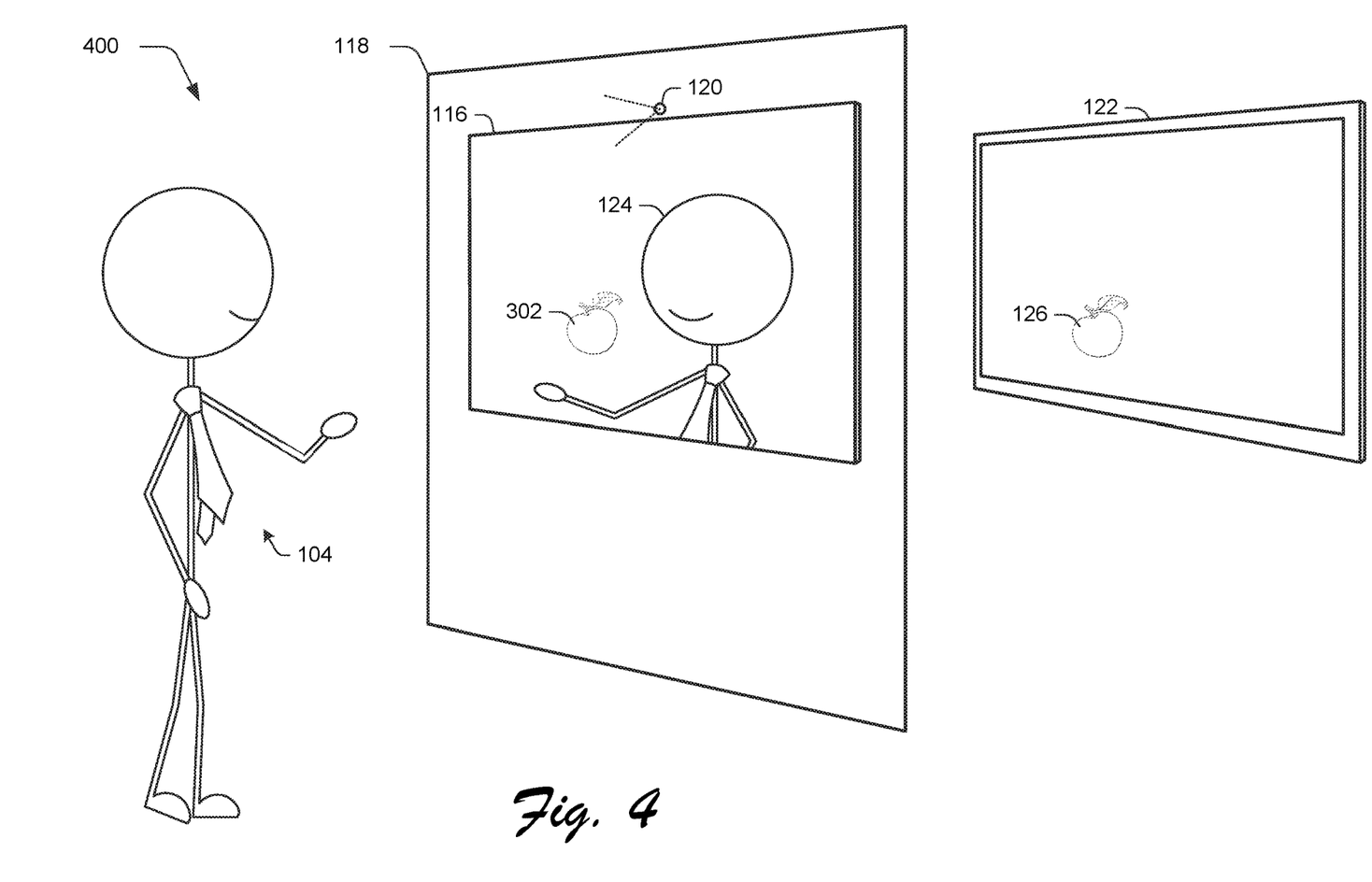

FIGS. 3 and 4 depict systems 300, 400 in an example implementation in which the display device 122 is configured to output the AR digital content 112 in three dimensions to support a display 302 of the AR digital content 112 by the semi-reflecting surface 116 as appearing in a physical environment between the user 104 and the semi-reflecting surface 116. As previously described, the AR mirror system 102 includes a processing system 106, computer-readable storage medium 108, semi-reflecting surface 116, housing 118, sensor 120, and display device 122. An AR content control module 110 is executable by the processing system 106 to control output of AR digital content 112.

The display device 122, as before, outputs the AR digital content 112. In this instance, however, the display device 122 supports an output in three dimensions, e.g., through use of stereoscopic images to support an appearance of depth, light fields, and other techniques that leverage an appearance of disparity. When this display is transmitted through the semi-reflecting surface 116, this causes the display 302 of the AR digital content 112 to have an appearance of depth as contrasted with a "flat" appearance of the previous section.

As a result, the user 104 may look at the display 302 as if the object had actual volume. The display device 122 may be configured in a variety of ways to support output in three dimensions, including active or passive techniques. In active techniques, a headset (e.g., glasses) are worn by the user 104 such that each eye of the user 104 is provided with a respective one of a stereoscopic pair of images to support an appearance of depth. In passive techniques, the display device 122 supports autostereoscopic display to provide a "glasses free" three-dimensional rendering of the AR digital content 112. This may be performed in a variety of ways, including use of parallax barriers, lenticular lenses, and so forth to redirect images to different viewing regions for viewing by the user 104, e.g., stereoscopic image pairs respectively to the left and right eyes of the user 104. Other examples are also contemplated, such as compressive light field displays.

Thus, like before a single display 302 of the AR digital content 112 is achieved by the semi-reflecting surface 116. In the previous section involving two dimensions, the display 126 is flat and appears with the reflection 124 of the user 104 superposed (e.g., in real-life 3D) over it. If the reflection of the user's 104 hand coincides with the depth of the display 302, the display 302 of the AR digital content 112 appears to hover above the hand as illustrated.

In the case of a three-dimensional display, the same geometry applies. The display 302 of the AR digital content 112, for comfortable viewing, still appears to occur "behind" and "through" the semi-reflecting surface 116. However, the same optical illusion from the previous example still applies, only this time is perceived with volume and without glasses. As a result, a three-dimensional display 302 (whether passive or active) of the AR digital content 112 by the display device 122 supports an increased appearance of depth when viewed by the user 104.

The display device 122 may also support the techniques described in the previous section to support head tracking to support viewing of different perspectives of the display 302 of the AR digital content and use of a natural user interface, e.g., through use of collision detection. In this way, AR content control module 110 may control output of the AR digital content 112, such as to move the content, select the content, and so forth. As a result, the AR content control module 110 supports rich display and interaction with the AR digital content 112 in a natural user interface that is not possible using convention techniques and systems.

Figure 5:
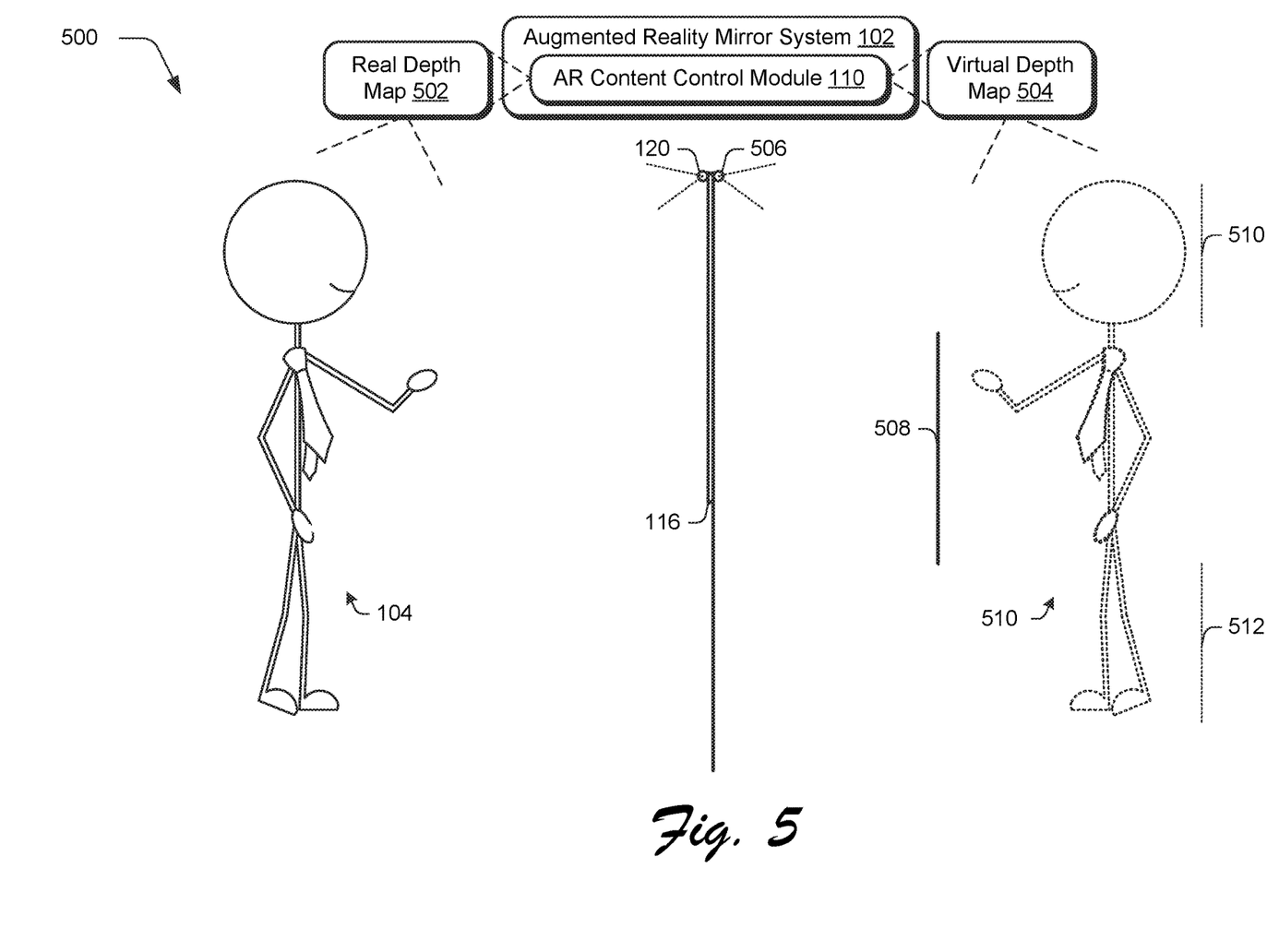
FIG. 5 depicts an example implementation showing a visual result of interaction between a user and AR digital content.

FIG. 5 depicts an example implementation 500 of interaction between the user 104 and AR digital content 112. Because of the physics of the optical setup of the AR mirror system 102, everything transmitted from the display device 122 through the semi-reflecting surface 116 is optically combined with the reflection the user 104 sees on the mirror. And because of the human visual system, the user 104 perceives the relative 3D position of the user's 104 reflection 124 with respect to the display 302 of the AR digital content 112.

While a realistic overlay is achieved by the optical illusion when the user 104 appears behind the display 302 of the AR digital content, the result appears wrong to the user 104 when the user 104 is disposed in front of this display 302. To handle such occlusions, the sensor 120 is used to generate a real depth map 502 describing 3D positions of the objects in the real physical world, e.g., the user 104 in the illustrated example. Analogously, a virtual depth map 504 is also obtained for the AR digital content 112 with respect to a virtual sensor 506, from the point of view of the mirror. The virtual depth map 504 describes a location, at which the AR digital content 112 is to appear based on a distance (i.e., depth) of the display device from the semi-reflecting surface.

By comparing the virtual depth map 504 to the real depth map 502, the AR content control module 110 determines which parts of the AR digital content 112 are occluded by the user's reflection 124. The AR content control module 110 may then remove those portions of the AR digital content from display, e.g., through use of black pixels in the digital image by the display device 122. As illustrated, for instance, a first part 508 of the AR digital content 112 is displayed that is disposed in a plane "in front" of the user 104 based on the depth map comparison. However, second and third parts 510, 512 of the AR digital content 112 are not displayed that are disposed in a plane "behind" the user 104 based on the depth map comparison. In this way, realism of user interaction with the AR mirror system 102 is improved.

Example Procedure

The following discussion describes techniques that may be implemented utilizing the previously described systems and devices. Aspects of each of the procedures may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-5.

Figure 6:
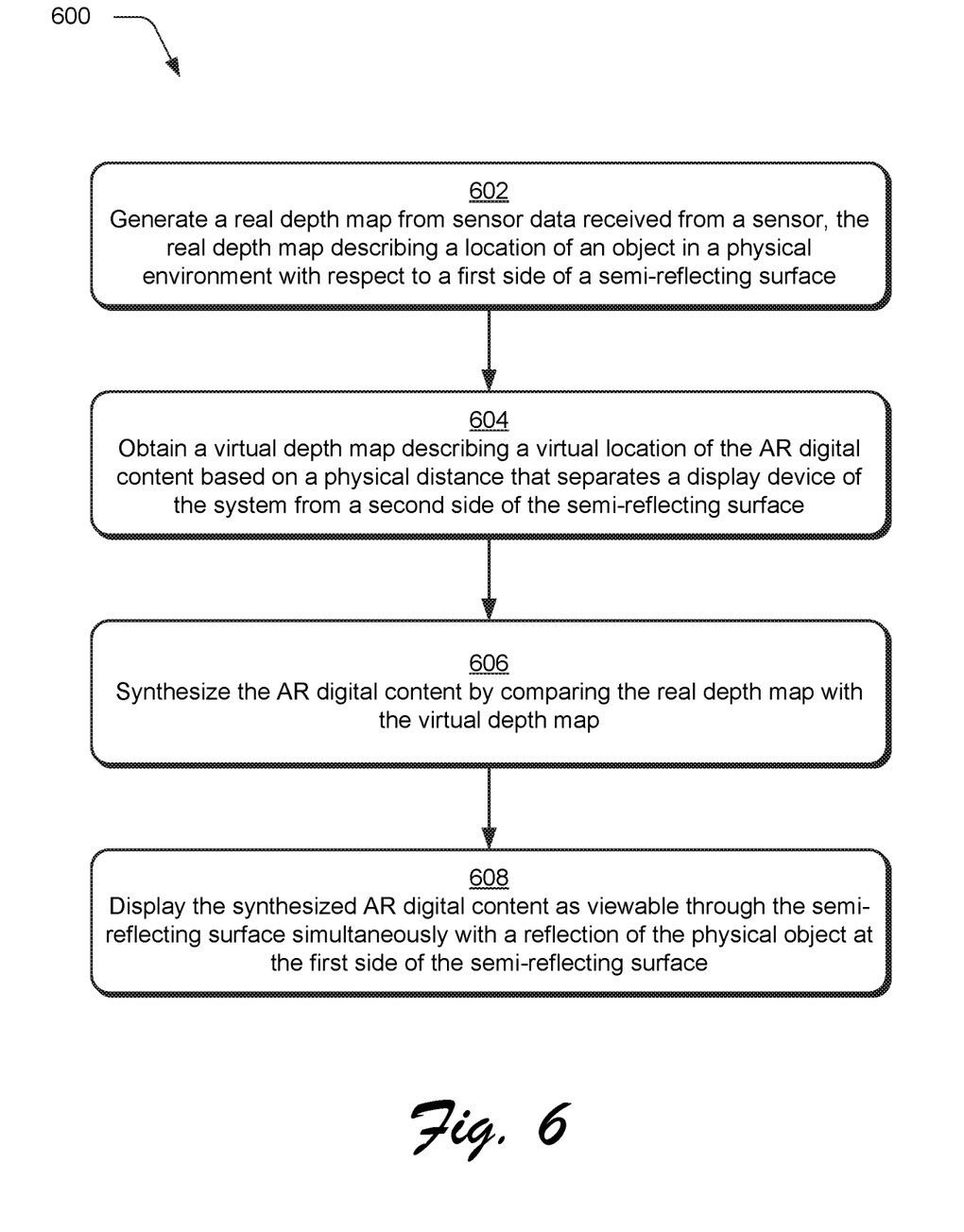
FIG. 6 is a flow diagram depicting a procedure in an example implementation in which an augmented reality mirror system is employed to support user interaction with AR digital content.

FIG. 6 depicts a procedure 600 in an example implementation in which an augmented reality mirror system is employed to support user interaction with AR digital content. A real depth map 504 is generated form sensor data received from a sensor 120. The real depth map 502 describes a location of an object in a physical environment with respect to a first side of a semi-reflecting surface 116 (block 602). The object, for instance, may be a human user 104 that is detected by a depth sensor. The real depth map 502 describes a physical environment, in which, the AR mirror system 102 is disposed in three dimensions.

A virtual depth map 504 is also obtained that describes a virtual location of the AR digital content based on a physical distance that separates a display device 122 of the system from a second side of the semi-reflecting surface 116 (block 604). In this way, the virtual depth map 504 describes a three dimensional location as to where the AR digital content is visible through the semi-reflecting surface as displayed by the display device 122.

The AR digital content 112 is then synthesized by comparing the real depth map with the virtual depth map (block 606). This may be used, for instance, to have the AR digital content 112 react to movement of a user's hand at a sensing plane in a 2D example, support interaction in a three-dimensional volume that coincides with a display of the AR digital content 112 as having volume in a three dimensional example, support occlusion techniques as described in relation to FIG. 5, and so forth.

The synthesized AR digital content 112 is displayed by the display device 116 as viewable through the semi-reflecting surface 116 simultaneously with a reflection 124 of the physical object at the first side of the semi-reflecting surface 116 (block 608). Thus, the AR digital content 112 if viewable through the semi-reflecting surface to appear at a depth behind the surface. This may be performed, for instance, to generate AR digital content 112 to appear in front of, behind, and/or a same depth of a reflection of a user on the semi-reflecting surface. AR digital content 112, for instance, may be generated in which a synthesized image is used to make a cloud appear that has portions in front of a user's reflection and appear behind a user's reflection. A user 104 may then interact with the AR digital content based on user inputs sensed by the sensor 120 as previously described. A variety of other examples are also contemplated as described in the previous sections.

Example System and Device

Figure 7:
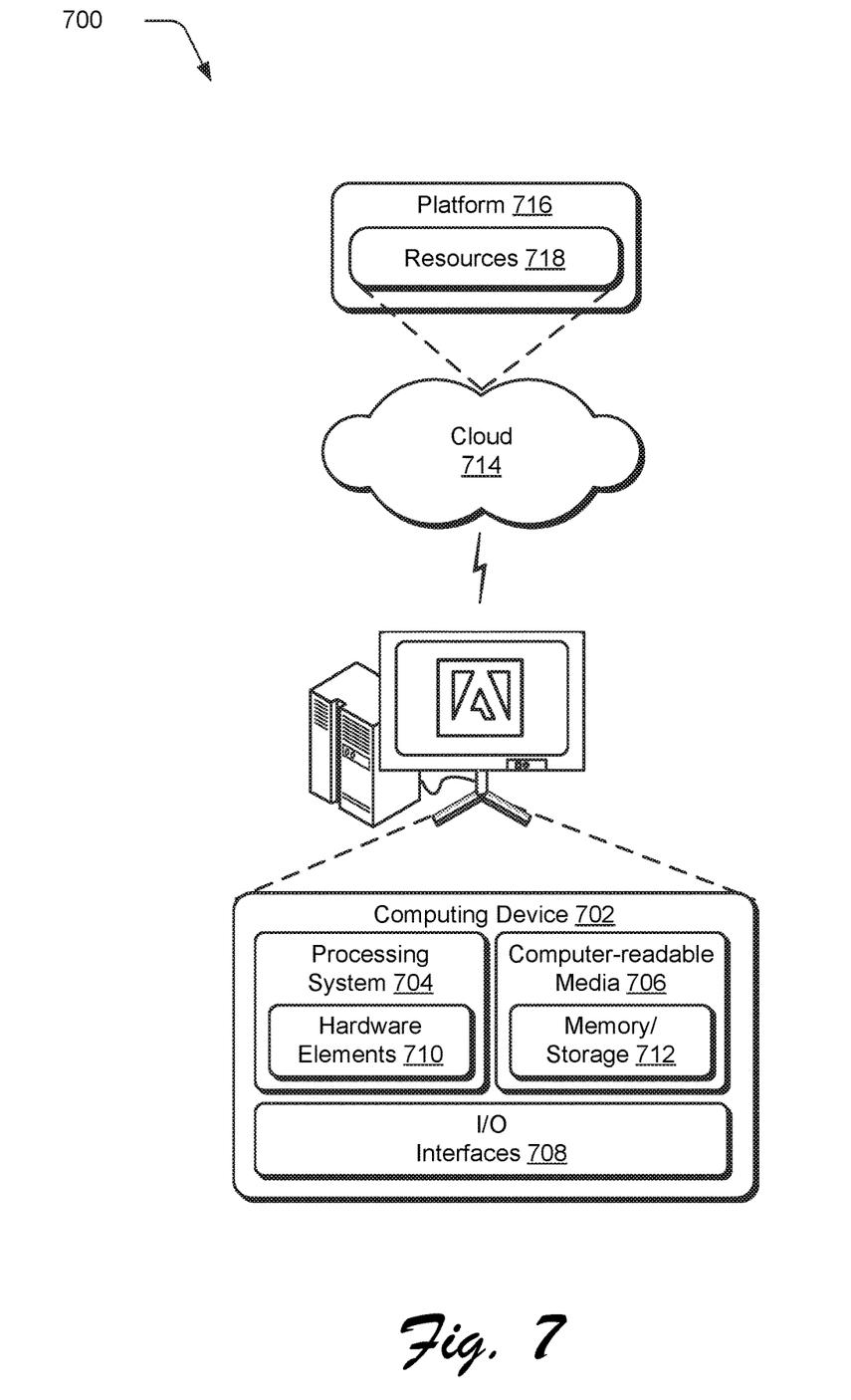
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein as part of the AR mirror system 102. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, a motor (e.g., for use as part of the display distance adjustment mechanism 128), and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to support output of augmented reality (AR) digital content, a method as implemented by a system including a sensor, a semi-reflecting surface, and a display device, the method comprising:
    generating, by the system, a real depth map from sensor data received from the sensor, the real depth map describing a location of a physical object in a first physical environment with respect to a first side of the semi-reflecting surface;
    obtaining, by the system, a virtual depth map describing a virtual location of the AR digital content in a second physical environment with respect to a second side of the semi-reflecting surface based on a physical distance greater than zero that separates the display device of the system from a second side of the semi-reflecting surface, the semi-reflecting surface located between the first physical environment and the second physical environment;
    detecting, by the system, placement of the physical object in the first physical environment;
    synthesizing, by the system, the AR digital content by comparing the real depth map with the virtual depth map, the synthesizing including detecting, as part of the comparing, occlusion of a portion of the AR digital content caused by the placement of the physical object and based on the virtual location in the second physical environment; and
    displaying, by the display device of the system, the AR digital content as viewable through the semi-reflecting surface simultaneously with a reflection of the physical object at the first side of the semi-reflecting surface, the displaying does not include the portion of the AR digital content that is occluded.

2. The method as described in claim 1, wherein the real depth map includes a sensing plane disposed at a physical distance from the first side of the semi-reflecting surface that matches the physical distance that separates the display device of the system from the second side of the semi-reflecting surface.

3. The method as described in claim 2, wherein the reflection of the physical object as disposed at the sensing plane by the semi-reflecting surface matches a depth of the displaying of the AR digital content as viewable through the semi-reflecting surface by the display device.

4. The method as described in claim 1, wherein the generating, the obtaining, the detecting, the synthesizing, and the displaying are performed in real time by the system to follow movement of the object from one location to another location as detected by the sensor.

5. The method as described in claim 4, wherein the movement includes changes in depth with respect to the semi-reflecting surface.

6. The method as described in claim 1, wherein the portion of the AR digital content is occluded by the object as being disposed closer to the semi-reflecting surface than a plane having a distance from the semi-reflecting surface that corresponds to the distance, at which, the display device is disposed from the semi-reflecting surface.

7. The method as described in claim 1, further comprising generating the sensor data by the sensor configured as a structured light grid array device or a time-of-flight camera system.

8. The method as described in claim 1, wherein the displaying of the AR digital content is performed using three dimensions (3D) by the display device.

9. The method as described in claim 8, wherein:
the location of the object is defined by the real depth map in three dimensions; and
the virtual depth map describes the virtual location of the AR digital content in three dimensions.

10. The method as described in claim 1, wherein the synthesizing is based at least in part on a depth of the object with respect to the semi-reflecting surface.

11. The method as described in claim 1, further comprising adjusting a plane at which user interaction is detected by the sensor by changing the physical distance that separates the display device of the system from the second side of the semi-reflecting surface.

12. An augmented reality (AR) mirror system comprising:
a housing;
a semi-reflecting surface having opposing first and second sides and disposed on the housing, the semi-reflecting surface is partially reflective and partially transmissive such that at least a portion of light displayed by a display device passes through the semi-reflecting surface from the second side and is visible from the first side of the semi-reflecting surface;
a sensor configured to detect a physical object at a first depth with respect to a first physical environment associated with the first side of the semi-reflecting surface;
the display device disposed within the housing at a second depth greater than zero with respect to a second physical environment associated with the second side of the semi-reflecting surface such that the light displayed by the display device appears at the second depth through the semi-reflecting surface as visible from the first side, the semi-reflecting surface located between the first physical environment and the second physical environment; and
an augmented reality control module implemented at least partially in hardware of a computing device to:
detect occlusion of a portion of the AR digital content by the physical object based on placement of the physical object at less than the first depth with respect to the semi-reflecting surface and based on the second depth;
synthesize augmented reality (AR) digital content based on the detected occlusion; and
control display of the AR digital content by the display device through the semi-reflecting surface as visible along with a reflection of the physical object by the semi-reflecting surface such that the portion of the AR digital content is not displayed.

13. The augmented reality (AR) mirror system as described in claim 12, wherein the first depth matches the second depth.

14. The augmented reality (AR) mirror system as described in claim 12, wherein the augmented reality control module is configured to synthesize the AR digital content and control display of the AR digital content in real time.

15. The augmented reality (AR) mirror system as described in claim 12, wherein the augmented reality control module is configured to synthesize the AR digital content based on movement of the physical object at the first depth.

16. The augmented reality (AR) mirror system as described in claim 12, wherein the augmented reality control module is configured to synthesize the AR digital content based on comparison of a real depth map generated from sensor data of the sensor and a virtual depth map describing a virtual location of the AR digital content based on a physical distance of the second depth that separates the display device from the second side of the semi-reflecting surface.

17. The augmented reality (AR) mirror system as described in claim 12, wherein the sensor is configured as a structured light grid array device or a time-of-flight camera system.

18. The augmented reality (AR) mirror system as described in claim 12, wherein display device is a three-dimensional (3D) display device.

19. In a digital medium environment to support output of augmented reality (AR) digital content, a system comprising:
at least one processor;
a computer-readable storage media having stored thereon multiple instructions that, when executed by the at least one processor, cause the at least one processor to perform acts including:
generating a real depth map from sensor data received from a sensor, the real depth map describing a location of a physical object in a first physical environment with respect to a first side of a semi-reflecting surface;
obtaining a virtual depth map describing a virtual location of the AR digital
content in a second physical environment with respect to a second side of the semi-reflecting surface based on a physical distance greater than zero that separates a display device from a second side of the semi-reflecting surface, the semi-reflecting surface located between the first physical environment and the second physical environment;
detecting placement of the physical object in the first physical environment;
synthesizing the AR digital content by comparing the real depth map with the virtual depth map, the synthesizing including detecting, as part of the comparing, occlusion of a portion of the AR digital content caused by the placement of the physical object and based on the virtual location in the second physical environment; and
displaying the AR digital content as viewable through the semi-reflecting surface simultaneously with a reflection of the physical object at the first side of the semi-reflecting surface, the displaying does not include the portion of the AR digital content that is occluded.

20. The system as described in claim 19, wherein the real depth map includes a sensing plane disposed at a physical distance from the first side of the semi-reflecting surface that matches the physical distance that separates the display device of the system from the second side of the semi-reflecting surface.

* * * * *